United States Patent
Petrova et al.

(10) Patent No.: US 8,822,579 B1
(45) Date of Patent: Sep. 2, 2014

(54) FROST-RESISTANT RUBBER BASED ON PROPYLENEOXIDE RUBBER AND NATURAL BENTONITES

(71) Applicants: Nataliya Nikolaevna Petrova, Yakutsk (RU); Viktoriya Vitalievna Portnyagina, Yakutsk (RU)

(72) Inventors: Nataliya Nikolaevna Petrova, Yakutsk (RU); Viktoriya Vitalievna Portnyagina, Yakutsk (RU)

(73) Assignees: North-Eastern Federal University, Yakutsk (RU); Science Inst of Oil and Gas Problems of SB RAS, Yakutsk (RU)

( * ) Notice: Subject to any disclaimer, the term of this patent is extended or adjusted under 35 U.S.C. 154(b) by 0 days.

(21) Appl. No.: 13/889,482

(22) Filed: May 8, 2013

(51) Int. Cl.
*C08K 13/02* (2006.01)

(52) U.S. Cl.
CPC ...................................... *C08K 13/02* (2013.01)
USPC ................. 524/322; 524/86; 524/87; 524/99; 524/100; 524/210; 524/211; 524/392; 524/436; 524/437; 525/403

(58) Field of Classification Search
CPC ...................................................... C08K 13/02
USPC ............... 524/322, 86, 87, 99, 100, 210, 211, 524/392, 436, 437; 525/403
See application file for complete search history.

(56) References Cited

FOREIGN PATENT DOCUMENTS

RU 2284338 C1 * 9/2006
RU 2294346 C1 * 2/2007

OTHER PUBLICATIONS

Petrova et al. "Rubbers Based on Mixtures of PropyleneOxide Rubber and Polytetrafluoroethylene", Kauchuk I Rezina, 2007, vol. 4, pp. 8-11.*
Chernikov et al. "Development of Formulations of Building Hermetic Compounds", Issue 4 (8), 2010.*

* cited by examiner

Primary Examiner — Michael M Bernshteyn
(74) Attorney, Agent, or Firm — Nadya Reingand; Yan Hankin

(57) ABSTRACT

A rubber compound based on propylene-oxide rubber SKPO, including sulfur, stearic acid, zinc oxide, thiuram disulphide, carbon black P-803. The compound is characterized by replacement of 2-mercaptobenzothiazole (kaptax), as well as fluoroplastic F-4, with dibenzothiazyl disulfide (altax), phenyl-$\beta$-naphthylamine (neozone D), dibutoxyethyl adipate, and natural bentonites. Use of a rubber compound with the proposed composition increases the service life of rubber seals during their operation in sealing devices, due to higher frost resistance and a lower residual compressive strain value. Also, the compound can be manufactured by a simpler method compared to modern production technology, eliminating the stage of joint mechanical activation of zeolite and dibutyl phthalate.

9 Claims, No Drawings

FROST-RESISTANT RUBBER BASED ON PROPYLENEOXIDE RUBBER AND NATURAL BENTONITES

CROSS-REFERENCE TO RELATED APPLICATIONS

This invention claims priority to, and incorporates by reference, Russian Patent Application No. 2012119452, filed May 11, 2012; now allowed, the Notice of Allowance is dated Apr. 24, 2013.

FIELD OF THE INVENTION

The claimed invention relates to the field of rubber industries, particularly the development of elastomeric sealing materials with a high level of frost resistance and low residual compressive stress value.

BACKGROUND OF THE INVENTION

Several known methods exist for the production of synthetic wear- and weather-resistant rubber-based compositions. EP19990937488 (Pub. No. EP1161487 B1) discloses a method for production of ebonite (i.e. hard rubber) through vulcanization of rubber with sulfer, a vulcanization accelerator, and active filler, where each additive ingredient is a powder with a particle size between 5 and 85 microns.

PCT/US1998/023114 (Pub. No. WO1999023148 A1) introduces production of a wear-resistant article through incorporation of a fluorocarbon with a polymer to produce a wear-resistant rubber compound. Compared to prior methods employing only surface treatment, actual incorporation of the material increases the longevity or permanence of the beneficial wear-resistant effect.

U.S. Pat. No. 5,240,766 discloses a composite gasket material having improved sealability and thermal stability, wherein the material contains an elastomeric binder component, a fiber component (such as carbon fibers), and a filler component.

U.S. Pat. No. 7,135,122 discloses a method of coating rubber with polytetrafluoroethylene for better resistance, where the bonded surface of the polytetrafluoroethylene portion of the composite is etched prior to application of the uncured admixture. The compounds are useful for making items such as seals, gaskets, chemically-resistant hoses, o-rings, and pump diaphragms.

U.S. Pat. No. 5,376,700 discloses a rubber material having both high frictional force as well as high abrasion resistance through use of highly hard material, such as bentonites. Such highly hard particles, formed with a rubber-philic coating layer by a fluidized coating treatment, are dispersed in the rubber material. Such material allows for beneficial properties such as adhesion and weather resistance.

The most promising materials for use in Far North conditions are rubbers based on propylene oxide rubber (SKPO), characterized by frost, ozone, and heat resistance. Their disadvantage is high residual compressive strain values (Govorova, O. A. et al., "Development of weatherproof rubber with improved low temperature and adhesive properties," Caoutchouc and Rubber, M.: 1999, No. 2, pp. 18-20; Govorova, O. A. et al., "Use of epichlorohydrin and propylene-oxide rubbers to improve usable temperature range of rubber based on butadiene-nitrile rubber," Caoutchouc and Rubber, M.: 2000, No. 4, pp. 18-20).

Most closely related to the technical nature of and results achieved by the claimed composition is the frost resistant rubber compound based on GPO, containing sulfur, thiuram disulfide, stearic acid, zinc oxide, 2-mercaptobenzothiazole, industrial carbon P-803, natural zeolites and dibutyl phthalate, subjected concurrently to mechanical activation in a planetary ball mill AGO-2s with a 70:30 ratio (Petrova, N. N., Portnyagina, V. V., Fedorova, A. F., Biklybaeva, R. F., Frost resistant compound based on propylene oxide rubber, Patent RF No. 2294341, M.: 2007). Natural zeolites are skeletal aluminosilicates with high adsorption capacity (Novgorodov, P. G., "Actual problems with development of zeolite material deposits from Hongyry," Scientific reading material, dedicated to the memory of Yakutia zeolite deposit discoverer K. E. Kolodeznikov, Yakutsk: Pub. YSC SB RAS, 2005, p. 124).

The disadvantages of existing rubbers include: (1) high residual compressive strain value, (2) complex production technology associated with preparation of the paste based on zeolites and plasticizer, and (3) lack of frost resistance all the way to −50° C., which is desirable to ensure reliable operation of parts made from the aforementioned rubbers.

There is also a known positive impact of natural bentonites on the structure and performance properties of certain rubbers (Tutorsky, I. A., Altsitzer, B. V., Pokidko, B. V., "Heat resistant nanocomposites with layered silicates based on butadiene-nitrile rubber," Caoutchouc and Rubber, M.: 2007, N2, p. 16; Tutorsky, I. A., Kuzin, V. S., Pokidko, B. V., "Polymer composites with layered silicates based on isoprene rubber," Caoutchouc and Rubber, M.: 2009, No. 4, p. 18). The referenced research shows that composites undergo improvement of physico-mechanical and dynamic properties, as well as reduction in gas permeability. Heat resistance is also increased due to the formation of exfoliated structures when layered silicates disperse and completely exfoliate in the polymer matrix into individual lamellar particles with nanometer thickness. The impact of layered aluminosilicates, as opposed to skeletal aluminosilicates, on the frost resistance of rubber has not yet been investigated.

SUMMARY OF THE INVENTION

The present invention introduces a new rubber compound based on propylene-oxide rubber SKPO. Similar to SKPO, the composite includes sulfur, stearic acid, zinc oxide, thiuram disulphide, and carbon black P-803. Additionally, however, kaptax, dibutyl phthalate, and fluoroplastic F-4 are removed from the traditional composition and replaced by altax, neozone D, dibutoxyethyl adipate, and natural bentonites. Each ingredient is combined in specific parts by weight as described below by the method of this invention.

Use of a rubber compound with the proposed composition increases the service life of rubber seals during their operation in sealing devices, due to higher frost resistance and a lower residual compressive strain value. Also, the compound is manufactured by a simpler method compared to modern production technology, eliminating the stage of joint mechanical activation of zeolite and dibutyl phthalate.

DETAILED DESCRIPTION OF THE PREFERRED EMBODIMENT

The developed rubbers can be used for producing rubber parts, which can be used in numerous sealing assemblies for machines and mechanisms, as well as other applications (e.g., producing seals for insulating windows in regions with cold climates).

The invention's technical objective is to lower residual compressive strain while improving low temperature performance of rubber compounds based on SKPO, achieved by the introduction of new mineral fillers in the elastomeric matrix.

The mineral fillers used are: (1) natural bentonites (Ligina, T. Z., Sabitov, A. A., Trofimova, F. A. et al., Bentonites and bentonite-like clay, Classification, composition characteristics, physicochemical and technological properties, Kazan: FSUI <<CNIIgeolnerud>>, 2005, p. 72) which are layered aluminosilicates; (2) the rest of the natural bentonites are minerals containing macro, micro, and ultra-microelements. The mineral composition can be shown by the following chemical formula:

$$M_x(Al_{4-x}Mg_x)Si_8O_{20}(OH)_4,$$

where M=cation of alkaline or alkaline-earth metals, and x=degree of isomorphic substitution (0.5-1.3).

The stated objective of this invention is achieved by the fact that the rubber compound, comprising propylene oxide rubber, sulfur, thiuram disulfide, stearic acid, zinc oxide, and carbon black P-803 (used instead of a paste based on natural zeolites and dibutyl phthalate plasticizer, obtained by joint processing in the planetary mill AGO-2S), also contains natural bentonite powder.

Plasticizer is also present in the mixture, but it is introduced into the rubber compound at the stage of mixing the rubber and ingredients.

In place of the traditional dibutyl phthalate, a dibutoxyethyladipate (DBEA, TU 2497-127-55778270-2002) is used, which is highly compatible with polar rubber and has low volatility compared to dibutyl phthalate; its use also results in rubber with higher frost resistance.

Instead of using "kaptax" as a polymerizing agent for the stated rubber compound, altax (dibenzothiazyl disulfide), an accelerator of the class of thiazoles with average activity, is used (Koshelev, F. F., Kornev, A. E., Bukanov, A. M., "General technology of rubber," 4th ed., M.: Chemistry, 1978, p. 164).

Additionally, the compound contains phenyl-β-naphthylamine (neozone D), an anti-aging agent of the amine type (Koshelev, F. F., Kornev, A. E., Bukanov, A. M., "General technology of rubber," 4th ed., M.: Chemistry, 1978, p. 198).

The complete rubber composition is given in Table 1 below.

TABLE 1

Rubber composition

| Ingredient | Prototype | Invention | | | | | Control | |
|---|---|---|---|---|---|---|---|---|
| | | 1 | 2 | 3 | 4 | 5 | 6 | 7 |
| SKPO | 100 | 100 | 100 | 100 | 100 | 100 | 100 | 100 |
| Stearic Acid | 1.0 | 1.0 | 1.0 | 1.0 | 1.0 | 1.0 | 1.0 | 1.0 |
| Zinc Oxide | 5.0 | 5.0 | 5.0 | 5.0 | 5.0 | 5.0 | 5.0 | 5.0 |
| Dibenzothiazyl disulfide | — | 1.5 | 1.5 | 1.5 | 1.5 | 1.5 | 1.5 | 1.5 |
| 2-mercaptobenzothiazole | 2.0 | — | — | — | — | — | — | — |
| Thiuram disulfide | 2.0 | 1.0 | 1.0 | 1.0 | 1.0 | 1.0 | 1.0 | 1.0 |
| Phenyl-β-naphthylamine | — | 2.0 | 2.0 | 2.0 | 2.0 | 2.0 | 2.0 | 2.0 |
| Carbon black P-803 | 60.0 | 60.0 | 60.0 | 60.0 | 60.0 | 60.0 | 60.0 | 60.0 |
| Sulfur | 1.5 | 1.5 | 1.5 | 1.5 | 1.5 | 1.5 | 1.5 | 1.5 |
| Natural zeolite and dibutyl phthalate paste | 15 | — | — | — | — | — | — | — |
| Natural bentonite | — | 0.5 | 1.0 | 3.0 | 5.0 | 10.0 | 0 | 20.0 |
| Dibutoxyethyladipate | — | 10.0 | 10.0 | 10.0 | 10.0 | 10.0 | 10.0 | 10.0 |

The rubber compound of the present invention (i.e. the proposed formulation) is prepared using standard equipment, introducing ingredients in the following order: propylene oxide rubber, stearic acid, zinc oxide, dibenzothiazyl disulfide, thiuram disulfide, bentonites, phenyl-β-naphthylamine, industrial carbon, dibutoxyethyladipate, sulfur. Vulcanization of the rubber compound is conducted at 150° C. and 12.0 MPa for 30 minutes. A period of at least 6 hours is required before stress-testing the vulcanizates.

The physico-mechanical vulcanizate properties are determined according to GOST 270-84 as follows: residual compressive strain (RCS) by GOST 9.029-74, volumetric wear by GOST 25509-79, frost resistance coefficient while in tension by GOST 408-78. Vulcanizate properties are shown in Table 2 below.

TABLE 2

Rubber properties

| Indicator | Prototype | Invention | | | | | Control | |
|---|---|---|---|---|---|---|---|---|
| | | 1 | 2 | 3 | 4 | 5 | 6 | 7 |
| Relative Tensile Strength (MPa) | 12.4 | 7.8 | 7.5 | 7.0 | 7.4 | 7.1 | 7.0 | 6.8 |
| Relative extension at break (%) | 242 | 165 | 161 | 134 | 143 | 118 | 192 | 104 |

TABLE 2-continued

| | | Rubber properties | | | | | | |
|---|---|---|---|---|---|---|---|---|
| | | Invention | | | | | Control | |
| Indicator | Prototype | 1 | 2 | 3 | 4 | 5 | 6 | 7 |
| Relative stress at 100% extension, MPa | 4.8 | 4.2 | 4.2 | 4.1 | 4.1 | 4.6 | 4.9 | 2.9 |
| Frost resistance coefficient during tension at −50° C., | 0.83 | 0.94 | 0.93 | 0.93 | 0.92 | 0.90 | 0.89 | 0.86 |
| at −35° C. | 0.66 | 0.88 | 0.87 | 0.86 | 0.85 | 0.84 | 0.78 | 0.84 |
| Residual compressive strain (100° C., 72 hr), % | 56.5 | 38.2 | 45.8 | 48.6 | 40.5 | 44.3 | 57.3 | 47.6 |

Use of a rubber compound with the proposed composition increases the service life of rubber seals during their operation in sealing devices, due to higher frost resistance and a lower residual compressive strain value. Also, the compound is manufactured by a simpler method compared to the prototype/prior art production technology, eliminating the stage of joint mechanical activation of zeolite and dibutyl phthalate.

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

What is claimed is:

1. A rubber composition, based on propylene-oxide rubber SKPO, comprising the following ingredients in parts by weight relative to amount of propylene-oxide rubber SKPO: 1.5% sulfur, 1% stearic acid, 5% zinc oxide, 1.5% dibenzothiazyl disulfide (altax), 1% thiuram disulfide, 2% phenyl-β-naphthylamine (neozone D), 60% carbon black P-803, 10% dibutoxyethyl adipate, and natural bentonite ranging from 0.5% to 10% wherein natural bentonite comprises of layered aluminosilicates and macro, micro, and ultra-microelements.

2. The composition according to claim 1, wherein the percentage by weight of natural bentonite is 0.5%.

3. The composition according to claim 1, wherein the percentage by weight of natural bentonite is 1%.

4. The composition according to claim 1, wherein the percentage by weight of natural bentonite is 3%.

5. The composition according to claim 1, wherein the percentage by weight of natural bentonite is 5%.

6. The composition according to claim 1, wherein the natural bentonite is in the form of a powder.

7. The composition of claim 1, wherein the bentonite mineral composition has a chemical formula, $M_x(Al_{4-x}Mg_x)Si_8O_{20}(OH)_4$, where "M" represents the cation of alkaline or alkaline-earth metals, and "x" represents the degree of isomorphic substitution (0.5-1.3).

8. The composition of claim 1, wherein said composition is formed by addition of said amounts of ingredients in the following order: propylene oxide rubber, stearic acid, zinc oxide, dibenzothiazyl disulfide, thiuram disulfide, natural bentonites, phenyl-β-naphthylamine, industrial carbon, dibutoxyethyladipate, and sulfur, and wherein subsequent vulcanization is carried out at 150 degrees Celsius at a pressure of 12.0 MPa for thirty minutes.

9. The composition according to claim 8, further comprising a waiting period of at least 6 hours before use or testing of the rubber composition in order for crosslinking reaction to take place till its completion.

* * * * *